July 23, 1968  S. A. CORY  3,394,295
ROTATING AND RECIPROCATING ELECTRIC MOTOR
Filed Oct. 4, 1965  2 Sheets-Sheet 1
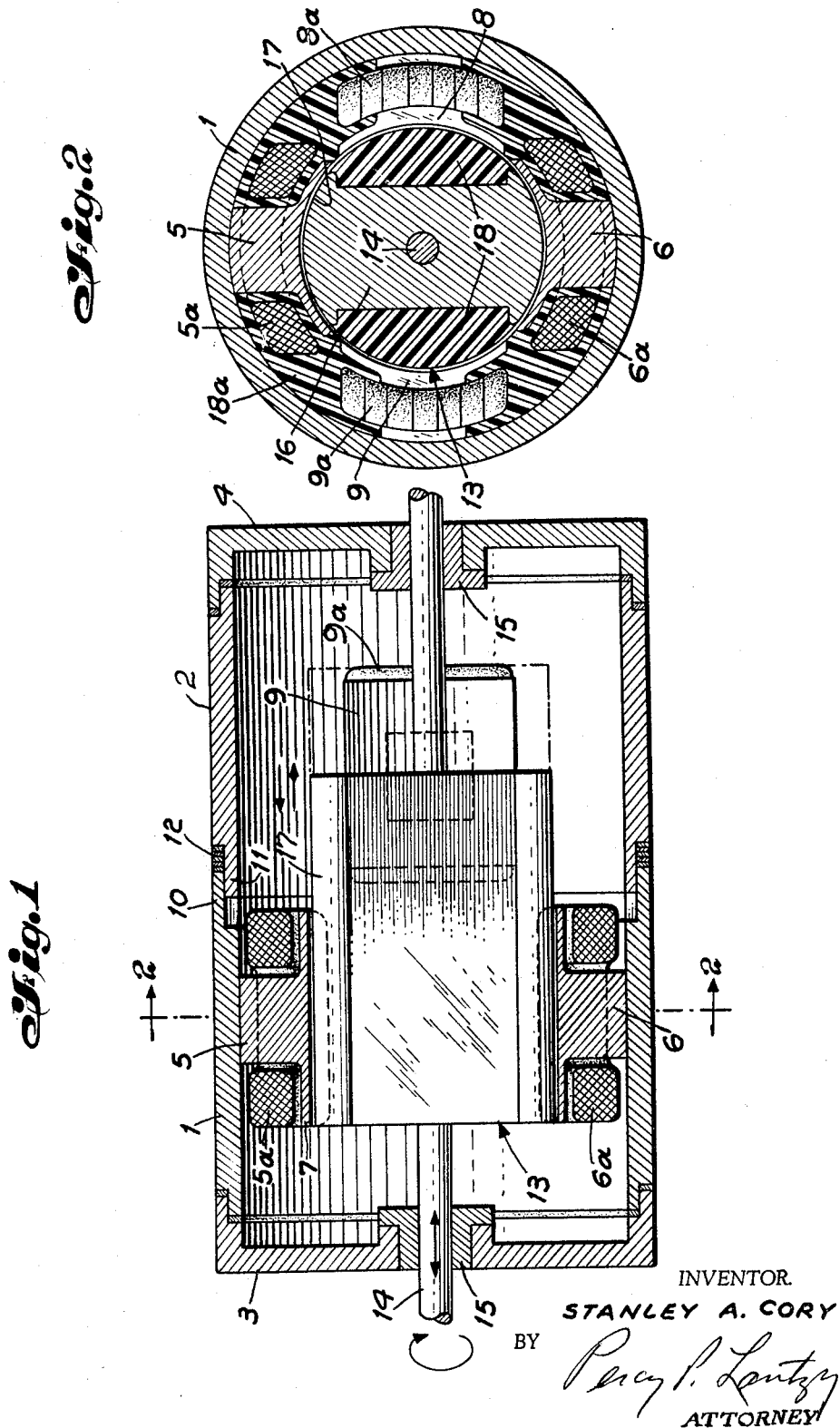
INVENTOR.
STANLEY A. CORY
BY
Percy P. Lantz
ATTORNEY July 23, 1968  S. A. CORY  3,394,295
ROTATING AND RECIPROCATING ELECTRIC MOTOR
Filed Oct. 4, 1965  2 Sheets-Sheet 2
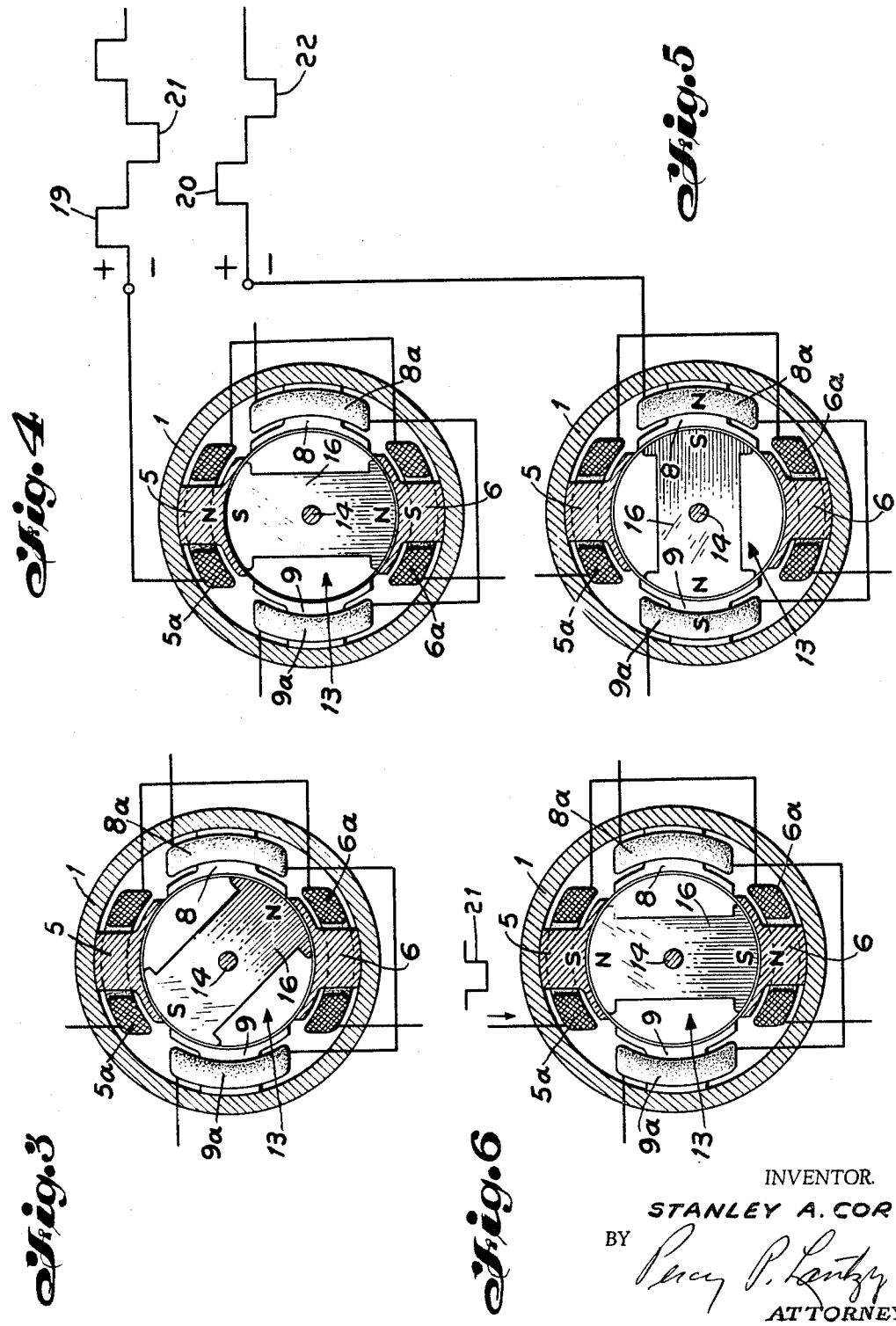
INVENTOR.
STANLEY A. CORY
BY
ATTORNEY 3,394,295
ROTATING AND RECIPROCATING
ELECTRIC MOTOR
Stanley A. Cory, Canoga Park, Calif., assignor to International Telephone and Telegraph Corporation, a corporation of Delaware
Filed Oct. 4, 1965, Ser. No. 492,521
7 Claims. (Cl. 318—115)

This invention relates to electric motors, and more particularly to a motor that has the ability to rotate and reciprocate simultaneously.

It has been the practice heretofore to design reciprocating motors using brushes, commutators, slip rings, or intermittent contacts. In addition, the previous units employe springs or mechanical means to translate rotary motions to linear motion and vice versa. It was also the design custom to use a constant drive motor to supply the rotary motion and auxiliary magnetic means to incorporate a linear motion. All the previous methods have one of the inherent limitations described above, and are not suited to meet the demands required by a new generation of equipment.

The present invention with its simplicity of construction and its simultaneous rotations and reciprocation meets new compressor needs, as well as initiate refinement of machines designed for such operations as cutting tools, mixing precision winding, engraving, air circulation, lock stitching, assembly operations and many others.

An object of this invention is to provide an electric motor that has the ability to rotate and reciprocate simultaneously without the use of brushes, commutators, slip rings, intermittent contacts, or mechanical means to translate rotary to linear motion.

Another object is to provide a new motor which is not only pulse actuated but wherein the relationships between the radial and axial movements are controlled by the duration and amplitude of the applied pulses; and further wherein control of the number of pulses per second will decide the operating speed for a given pole configuration.

A feature of this invention is that the reciprocating strokes can be adjusted in length and in number per revolution.

The above-mentioned and other features and objects of this invention will become more apparent by reference to the following description taken in conjunction with the accompanying drawings in which:

FIG. 1 is a longitudinal sectional view of the motor;

FIG. 2 is a cross-section view taken along line 2—2 of FIG. 1;

FIG. 3 is a cross-section view of the motor showing the rotary mode in unenergized position; and FIGS. 4, 5, and 6 are similar cross-section views showing the rotary mode in first, second, and third energized positions.

Referring to FIGS. 1 and 2, the motor is shown to comprise two cylindrical housing sections 1 and 2 and two end housing members 3 and 4. The cylindrical housing section 1 carries a pair of pole members 5, 6 diametrically disposed, each being provided with a curved pole face 7. The housing section 2 carries a pair of pole members 8 and 9 in quadrature arrangement with respect to poles 5, 6. The two pair of pole members of the stator are thus disposed in axially spaced relation as well as in angularly disposed relation. The axial positioning of the two pairs of poles and therefore the fields provided thereby is accomplished by providing the cylindrical housing sections with flanges 10 and 11 which overlap and are held in adjusted position by the insertion of ring shaped shims 12 at the end of one of the flanges.

The rotor 13 is carried by a shaft 14 which is supported in bearings 15 carried by the end housing members 3 and 4. The bearings may be of any suitable type that will provide freedom for the shaft to slide axially as well as to rotate. For example, hydrostatic air bearings may be used for this purpose as well as linear ball bearings and others available in the market which provide a minimum of friction. The rotor includes a permanent magnet 16 having curved pole faces 17, the peripheral space between the pole faces being filled with epoxy 18 to present a continuously curved surface for the rotor. Likewise, the space between the pole members of the stator are filled with epoxy as indicated at 18a, FIG. 2. The pole faces 17 of the rotor 13 are of a length greater than the faces 7 of the pole members of the stator. As shown in FIG. 1 the pole faces 17 traverse the pole faces 7 of pole members 5, 6 and also about half of the pole faces of poles 8, 9. Thus when there is a change in the energization of the pole pair 5, 6 to poles 8, 9 the field of the latter will attract the rotor causing it to revolve and also move axially in the direction of pole members 8, 9.

Referring to FIGS. 3 to 6, the description of operation will be explained. These four figures represent a cross-sectional view of the motor along lines 2—2 of FIG. 1 showing the rotor in different positions during operation. In FIG. 3 the fields are not energized and the rotor is in a random position. When a positive pulse such as indicated at 19 is applied to the coils 5a and 6a, FIG. 4, the poles 5, 6 are energized with polarities north and south as indicated, thereby attracting the permanent magnet of the rotor from its random position to the position indicated in FIG. 4. When the pulse 19 terminates thus removing electrical energy from the coils of poles 5, 6 a new pulse 20 is applied to the coils 8a and 9a of poles 8, 9. The fields of poles 8, 9 now attract the permanent magnet of the rotor causing the rotor to rotate clockwise to the position shown in FIG. 5. The field produced by pulse 20 also attracts the rotor to move axially as well as rotary, the rotor moving to the position of minimum reluctance. The next pulse 21 applied to the coils of poles 5, 6 is of negative polarity producing a reverse field as indicated in FIG. 6. This field causes the rotor to revolve another 90 degrees clockwise to the position shown in FIG. 6. This field also causes the rotor to move axially to the position shown in FIG. 1. After the termination of pulse 21 a negative pulse 22 is applied to the coils of poles 8, 9 thus causing the rotor to revolve another 90 degrees to a position 180° from that indicated in FIG. 5 and again to move it axially to the right in FIG. 1 into the field of poles 8, 9.

It will be observed that the motor of my invention will produce a continued rotation of the rotor as the two-pulse series are applied to the coils in the order shown. It will also cause the rotor to reciprocate as it rotates. The speed of the rotor will depend upon the number of pulses per second. Furthermore, the pole system may be increased from two poles per section to four, six, eight or *n* poles as may be desired. Such change, of course, will affect the size and rotary speed of the motor. When the rotor is up to speed it is possible to remove certain of the pulses to change the rate of reciprocation, for example, and still maintain a smooth rotation.

While the pulses are shown to be direct current and of alternate polarity it should be clear that alternating current may also be applied in the place of distinct pulses. By changing the amplitude and duration of the pulses, the speed of rotation and the force of reciprocation can be adjusted.

While I have described above the principles of my invention in connection with specific apparatus, it is to be clearly understood that this description is made only by way of example and not as a limitation to the scope of my invention, as set forth in the objects thereof and in the accompanying claims.

I claim:
1. An electric motor comprising a rotor having two poles, means supporting said rotor for rotary and axial movements, a stator having two fields one spaced axially and at a radial angle relative the other, and the poles of said rotor being of an axial length such that when it traverses one of said fields it also traverses partially the other of said fields, and means to energize said fields alternately to cause said rotor to rotate and reciprocate simultaneously.

2. An electric motor according to claim 1 wherein said rotor includes a permanent magnet disposed diametrically of said rotor with the pole faces forming parts of the curved outer surface of the rotor.

3. An electric motor according to claim 1, wherein the stator includes two housing sections, one for each of said fields, and means to adjust the axial position of one of said housing sections relative to the other to thereby adjust the positions of said fields relative each other.

4. An electric motor according to claim 3, wherein each of said housing sections comprises a cylindrical portion having a peripheral flange adapted to be disposed in overlapping relation with the flange of the outer section and wherein said means to adjust comprises a plurality of ring-like shims disposed in the gap at the end of one of said flanges, the number of shims being determined by the desired relative positions of the two fields.

5. An electric motor according to claim 1, wherein each field includes a pair of diametrically disposed pole members, a coil disposed about each pole member and said rotor includes a permanent magnet disposed diametrically of said rotor, the axial length of the pole faces of said rotor being greater than the face of each pole member so that when the pole faces of said rotor traverses the faces of one pair of pole members they extend in partial overlapping relationship with the faces of the other pair of pole members.

6. An electric motor according to claim 1, wherein the means to supply energy includes two sources of pulses, one source for each field, the pulses supplied to one field being timed alternately with respect to the pulses for the other field.

7. An electric motor according to claim 6, wherein the polarities of the pulses of each source are alternately positive and negative.

References Cited
UNITED STATES PATENTS

| | | | |
|---|---|---|---|
| 637,809 | 11/1899 | Meissner | 310—15 |
| 1,014,495 | 1/1912 | Lincoln | 310—20 |
| 2,628,319 | 2/1953 | Vang | 310—15 |
| 3,184,933 | 5/1965 | Gaugler | 318—35 X |

MILTON O. HIRSHFIELD, *Primary Examiner.*

WARREN E. RAY, *Assistant Examiner.*